United States Patent [19]

Forni et al.

[11] 3,853,786

[45] Dec. 10, 1974

[54] SUPPORTED CATALYSTS FOR THE PRODUCTION OF 4-METHYL-PENTENE FROM PROPYLENE

[75] Inventors: Lucio Forni; Renzo Invernizzi, both of Milan, Italy

[73] Assignee: Societa' Italiana Resin S.I.R. S.p.A., Milan, Italy

[22] Filed: Aug. 6, 1973

[21] Appl. No.: 385,769

[30] Foreign Application Priority Data

Sept. 20, 1972 Italy .................................. 29423/72

[52] U.S. Cl................ 252/440, 252/447, 252/459, 252/476, 260/683.15 E
[51] Int. Cl............................................. B01j 11/82
[58] Field of Search ........... 252/440, 447, 459, 476; 260/683.15 E

[56] References Cited
UNITED STATES PATENTS

| | | | |
|---|---|---|---|
| 3,331,884 | 7/1967 | Yeo et al.................. | 260/683.15 E |
| 3,389,190 | 6/1968 | Alderson et al............ | 260/683.15 E |
| 3,622,648 | 11/1971 | Schlomer et al.......... | 260/283.15 E |
| 3,756,963 | 9/1973 | Forni........................ | 260/683.15 E |

Primary Examiner—W. Cannon
Attorney, Agent, or Firm—Sughrue, Rothwell, Mion, Zinn & Macpeak

[57] ABSTRACT

Supported catalysts containing alkali metal for the production of 4-methyl-1-pentene from propylene and a process for their production by heating previously dried support particles in an inert gas atmosphere for at least about 30 minutes at a temperature of at least about 150°C, mixing the support particles obtained with a compound of a transition metal that is thermally decomposable at below about 400°C and an alkali metal and heating the mixture obtained for about 1 to 120 minutes in an inert gas stream to about 150° to 500°C.

10 Claims, No Drawings

3,853,786

SUPPORTED CATALYSTS FOR THE PRODUCTION OF 4-METHYL-PENTENE FROM PROPYLENE

The invention relates to new supported catalysts containing alkali metal, a process for their production, and their use for the production of 4-methyl-1-pentene from propylene.

It is known that 4-methyl-1-pentene can be used for the production of polymers characterized by high crystallinity and transparency, excellent mechanical and electrical properties, and high stability and resistance to chemicals. These poly-(4-methyl-1-pentenes) are advantageously used for the production of moulded articles such as containers and packaging material for foods and parts for electrical equipment. The polymers of 4-methyl-1-pentene are normally prepared by polymerization of the monomer with the aid of Ziegler-Natta catalysts; cf. Encyclopedia of Polymer Science and Technology, Interscience Publishers, New York, London, Sydney, Vol.7 (1967), pages 764–765; Vol.9 (1968), page 446, and Vol. 13 (1970), page 20, and Belgian Patent No. 616 564. A particularly pure 4-methyl-1-pentene should be used for the preparation of the polymers having the properties described above, especially having high crystallinity and transparency.

It is known that 4-methyl-1-pentene can be prepared by dimerization of propylene in the presence of catalysts consisting of an alkali metal applied to a support. Examples of supports that are particularly suitable for these catalysts are graphite, potassium carbonate, alkali metal silicates, alkali metal halides, magnesium sulphate, and talc. Furthermore, U.S. Pat. No. 3,175,020 discloses a process for the production of 4-methyl-1-pentene which comprises contacting propene at a pressure in the range from about 10 to 105 atm (150 to 1,500 p.s.i.g.) and at a temperature in the range from about 65° to 205°C (150° to 400° F) with a dimerization catalyst consisting essentially of potassium metal disposed upon substantially anhydrous alumina, having a surface area below about 20 square meters per gram.

However, the known processes have the disadvantage that the yield of the propylene dimerization and the selectivity for 4-methyl-1-pentene are relatively low. Considerable quantities of other isomers of 4-methyl-1-pentene, such as cis-4-methyl-2-pentene, trans-4-methyl-2-pentene, 2-methyl-1-pentene, 2-methyl-2-pentene, 1-hexene, cis-2-hexene, trans-2-hexene, cis-3-hexene, and trans-3-hexene are formed in addition to 4-methyl-1-pentene.

Though special measures have been taken in the production of the catalysts in order to improve them, conversions of about 40 percent in the dimerization of propylene and selectivities of about 80 percent for 4-methyl-1-pentene are attained only in exceptional cases. The values normally reached are only 25 to 35 percent for the conversion and 50 to 65 percent for the selectivity. Expensive operations are therefore necessary for the recycling of unreacted propylene to the dimerization reactor and purification of the reaction product. Because of the large quantity of by-products, it is sometimes even necessary to isomerize the by-products to the desired product.

One purpose of the invention is therefore to provide new catalysts for the production of 4-methyl-1-pentene with which a high conversion in the dimerization of propylene and a high selectivity for 4-methyl-1-pentene are obtained. Another purpose of the invention is to provide a process for the production of these new catalysts. Finally, it is a purpose of the invention to provide an improved process for the production of 4-methyl-1-pentene from propylene using these new catalysts, which gives higher conversions of propylene and higher selectivity for 4-methyl-1-pentene.

The object of the invention is thus a process for the production of supported catalysts containing alkali metal, characterized in that a. previously dried support particles are heated in an inert gas atmosphere for at least about 30 minutes to a temperature of at least about 150°C, b. the support particles obtained in accordance with a) are mixed with a compound of a transition metal that is thermally decomposable at below about 400°C and an alkali metal in a quantity such that the total weight of alkali metal and of the transition metal compound, both calculated as the weight of metal, is about 1 to 80 wt. percent based on the weight of the support, the atomic ratio of alkali metal to transition metal being in the range between about 50 : 1 and 1 : 1, and c. the mixture obtained in accordance with b) is heated for about 1 to 120 minutes to about 150° to 500°C in an inert gas stream with stirring.

With the catalysts of the invention, a yield of generally more than 40 percent in the dimerization of propylene and a selectivity for 4-methyl-1-pentene of generally at least 80 percent are achieved.

In the process of the invention, a support in a divided form that has been dried for at least about 5 hours, preferably about 12 hours, at temperatures of about 100° to 150°C is used. The commonly used supports, preferably graphite, potassium carbonate, alkali metal silicates, alkali metal halides, magnesium sulphate, or talc, may be used as supports. Potassium carbonate is preferably used as the support. The dried particles of support are then heated in a stream of inert gas for about 30 minutes, preferably about 2 hours, to a temperature of at least about 150°C. Anhydrous nitrogen is normally used as the inert gas, and the optimum temperature for the treatment of the previously dried support particles is about 250°C. The support is in form of irregular particles of a size of 0.25 to 5 mm. The preferred size is about 1 mm.

Still in the stream of inert gas, the particles of support are mixed with the alkali metal and the thermally decomposable compound transition metal in the proportions given above.

The alkali metal used is preferably metallic sodium or potassium, which is previously carefully cleaned and stored under an inert solvent such as xylene. The preferred thermally decomposable transition metal compounds are compounds of gold, nickel, chromium, palladium, cobalt, or tungsten.

In a preferred embodiment of the invention, the support is potassium carbonate, which, after predrying and heat treatment, is mixed with the alkali metal and the transition metal compound in a quantity such that the total weight of the alkali metal and the transition metal compound, both calculated as the weight of metal, is about 1 to 30 wt. percent based on the weight of support. Moreover, the transition metal compound is used in a quantity such that the atomic ratio of transition metal to alkali metal is in the range between about 1:50 and 1:1, preferably about 1:15 to 1:5. The thermally decomposable transition metal compounds used in accordance with the invention are preferably salts, oxides, or hydroxides of these metals that decompose below about 400°C. Specific examples of such compounds are the oxides, acetates, carbonates, oxalates, nitrates, benzoates, cyanides, halides, and transition metal ammine complexes, i.e., complexes of the transition metals with ammonia and amines, such as tetrammineplatinum hydroxide or diammineplatinum nitrite. One or more of these compounds may be used.

In a preferred embodiment of the process of the invention, the transition metal compound is added to the support at temperatures of about 100° to 240°C with stirring and in a stream of inert gas. The temperature of the mass is then lowered to the melting point of the alkali metal selected, and the alkali metal is added to the mixture with stirring and in an inert gas atmosphere. The mixture is then heated for about 1 to 120 minutes, preferably about 10 to 90 minutes, at about 150° to 500°C., preferably about 220° to 350°C.

Under these conditions the decomposition product of the transition metal compound probably reacts with the alkali metal and is very finely distributed on the support together with the alkali metal, i.e., the reaction product of the decomposed transition metal compound and the sodium metal is distributed in an active form on the surface, including the pore surfaces, of the support. After cooling, the catalyst is ready for use. The finished catalyst is preferably stored and handled under nitrogen or some other inert gas. This also applies to introduction into the dimerization reactor.

The dimerization of propylene with the catalysts prepared in accordance with the invention is carried out in the same manner as with the known supported catalysts containing alkali metal by a known method. The dimerization of propylene to 4-methyl-1-pentene with the catalysts of the invention is preferably carried out with a propylene throughput of about 0.1 to 50 volumes of liquid propylene per volume of catalyst per hour at temperature of about 100° to 250°C and at pressures of about 20° to 350°C atm. IN particular, the process of the invention is carried out at temperatures of about 150°C, pressures of about 70 atm, and a feed rate of about 1 volume of liquid propylene per volume of catalyst per hour.

The examples illustrate the invention without limiting it.

EXAMPLE 1

10 g of potassium carbonate are dried for 15 to 18 hours at 120°C. 5.52 g of this dried potassium carbonate are heated in a stream of anhydrous nitrogen for 1 hour at about 280°C. After cooling to 120°C, the potassium carbonate is mixed with 0.915 g of $AuH(NO_3)_4 \cdot 3H_2O$. The mixture is heated to 240°C over a period of 15 minutes, cooled to 100°C, and then mixed with 0.6 g of metallic sodium that has been carefully purified and stored under anhydrous xylene. Still in a stream of anhydrous nitrogen and with continuous stirring, the mixture is heated to 300°C until the alkali metal is completely dispersed in the mass. The catalyst obtained is cooled and introduced into a tubular reactor in an inert gas atmosphere.

Propylene is introduced into the reactor at a rate of 1 volume of liquid propylene per volume of catalyst per hour and dimerized at a temperature of 150°C and a pressure of 70 atm. The experiment is continued for 9 hours.

EXAMPLE 2

The catalyst is prepared in accordance with Example 1, but 5.52 g of dried potassium carbonate, 0.455 g of $Ni(CH_3COO)_2 \cdot 4H_2O$, and 0.51 g of metallic sodium are used.

EXAMPLE 3

The catalyst is prepared in accordance with Example 1, but 5.52 g of dried potassium carbonate, 0.419 g of $Cr(CH_3COO)_3$, and 0.51 g of metallic sodium are used.

EXAMPLE 4

The catalyst is prepared in accordance with Example 1, but 5.52 g of dried potassium carbonate, 0.488 g of $Pd(NO_3)_2 \cdot 2H_2O$, and 0.51 g of metallic sodium are used.

EXAMPLE 5

The catalyst is prepared in accordance with Example 1, but 5.52 g of dried potassium carbonate, 0.456 g of $Co(CH_3COO)_2 \cdot 4H_2O$, and 0.51 g of metallic sodium are used.

EXAMPLE 6

The catalyst is prepared in accordance with Example 1, but 5.52 g of dried potassium carbonate, 0.406 g of $H_2WO_4$, and 0.51 g of metallic sodium are used.

EXAMPLE 7

The catalyst is prepared in accordance with Example 1, but 5.52 g of dried potassium carbonate, 0.498 g of $Cr_2(C_2O_4)_3$, and 0.51 g of metallic sodium are used.

COMPARISON EXAMPLE

For comparison, a conventional catalyst is prepared in a known manner from 5.52 g of potassium carbonate and 0.51 g of metallic sodium.

The catalysts of the invention prepared in accordance with Examples 2 to 7 and the conventional catalyst prepared in accordance with the Comparison Example are used for the dimerization of propylene in accordance with Example 1. The results are shown in Table I.

Table I

| Catalyst of example | Conversion of propylene (%) | Selectivity for 4-methyl-1-pentene (%) | Selectivity for other isomers (%) | Selectivity for higher-boiling products (%) |
|---|---|---|---|---|
| 1 | 56.5 | 79.5 | 20.5 | traces |
| 2 | 41 | 83 | 17 | do. |
| 3 | 45.5 | 86.5 | 13.5 | do. |
| 4 | 49.5 | 78 | 22 | do. |
| 5 | 36 | 87 | 13 | do. |
| 6 | 41.5 | 89.5 | 11.5 | do. |
| 7 | 40 | 86 | 14 | do. |
| Comparison example | 10 | 80 | 19.5 | 0.5 |

The superiority of the catalysts of the invention can be seen from Table I.

What we claim is:

1. Process for the production of a supported catalyst containing alkali metal for dimerization of propylene to 4-methyl-1-pentene, characterized in that
   a. previously dried support particles are heated in an inert gas atmosphere for at least about 30 minutes to a temperature of at least about 150°C,
   b. the support particles obtained in accordance with a) are mixed with a compound of a transition metal that is thermally decomposable at below about 400°C, said compound being one of gold, nickel, chromium, palladium, cobalt or tungsten, and an alkali metal in a quantity such that the total weight of alkali metal and of the transition metal compound, both calculated as the weight of metal, is about 1 to 80 wt. percent based on the weight of the support, the atomic ratio of alkali metal to transition metal being in the range between about 50 : 1 and 1 : 1, and
   c. the mixture obtained in accordance with b) is heated for about 1 to 120 minutes to about 150 to 500°C in an inert gas stream with stirring to decompose the transition metal compound.

2. Process in accordance with claim 1, characterized in that graphite, potassium carbonate, an alkali metal silicate, an alkali metal halide, magnesium sulphate, or talc is used as the support.

3. Process in accordance with claim 1, characterized in that sodium or potassium is used as the alkali metal.

4. Process in accordance with claim 1, characterized in that the transition metal compound and the alkali metal are used in an atomic ratio of about 1:15 to 1:5.

5. Process in accordance with claim 1, characterized in that the mixture of the support, the alkali metal, and the thermally decomposable transition metal compound is heated for about 10 to 90 minutes to temperatures of about 220° to 350°C.

6. Process in accordance with claim 1, characterized in that in step a) support particles are used which have been dried for at least about 5 hours at temperatures of about 100° to 150°C.

7. Process in accordance with claim 1, characterized in that in step a) the heating of the dried support particles is carried out for about 2 hours at a temperature of about 250°C.

8. Process in accordance with claim 1, characterized in that the support is potassium carbonate which, after predrying and heat treatment, is mixed with the alkali metal and the transition metal compound in a quantity such that the total weight of the alkali metal and the transition metal compound, both calculated as the weight of metal, is about 1 to 30 wt. percent based on the weight of the support.

9. Process in accordance with claim 2, characterized in that potassium carbonate is used as the support.

10. Process in accordance with claim 6, characterized in that in step a) support particles are used which have been dried for at least about 12 hrs. at said temperatures.

* * * * *